United States Patent [19]

Mok

[11] Patent Number: 4,784,360
[45] Date of Patent: Nov. 15, 1988

[54] BEVERAGE COOLER-CARRIER FOR VEHICLES

[76] Inventor: Peter Mok, 4343 Forest Oaks Dr., Thousand Oaks, Calif. 91360

[21] Appl. No.: 930,443

[22] Filed: Nov. 14, 1986

[51] Int. Cl.[4] .............................................. B60R 7/06
[52] U.S. Cl. ................................ 248/313; 248/311.2; 296/37.8
[58] Field of Search .................... 248/313, 311.2, 210, 248/316.1, 110; 296/37.8, 37.1, 37.12

[56] References Cited

U.S. PATENT DOCUMENTS

| | | | |
|---|---|---|---|
| D. 226,623 | 4/1973 | Shuford. | |
| 1,550,558 | 8/1925 | Soldani | 248/313 |
| 1,646,562 | 10/1927 | Snow | 248/313 |
| 2,525,952 | 10/1950 | Saterlie et al. | 296/37.8 X |
| 2,532,244 | 11/1950 | Pasmore | 248/311.2 X |
| 2,834,566 | 5/1958 | Bower | 296/37.8 |
| 2,992,804 | 7/1961 | Doran | 248/311.2 |
| 3,033,405 | 5/1962 | Adell | 248/311.2 X |
| 3,794,285 | 2/1974 | Barts | 248/311.2 |
| 3,987,993 | 10/1976 | Hopkins | 248/311.2 X |
| 4,025,016 | 5/1977 | Brothers | 248/210 |

FOREIGN PATENT DOCUMENTS 0022536 2/1980 Japan ................. 296/37.12

*Primary Examiner*—Ramon S. Britts
*Assistant Examiner*—Karen J. Chotkowski
*Attorney, Agent, or Firm*—Sheldon & Mak

[57] ABSTRACT

A beverage carrier apparatus that can be securely fastened to a structure such as a ventilation fixture of a vehicle is disclosed, the carrier apparatus laterally receiving a container of the beverage. The apparatus includes a housing having a supporting surface for the container, a hook member and associated clamp screw for clamping the housing to the fixture, by engaging a louver of the fixture, and a plurality of finger members for releasably holding the container on the supporting surface. The housing forms a duct for transmitting ventilating or cooling air from the fixture, the air passing in communication with the container for cooling the beverage, and then to the interior of the vehicle.

1 Claim, 1 Drawing Sheet

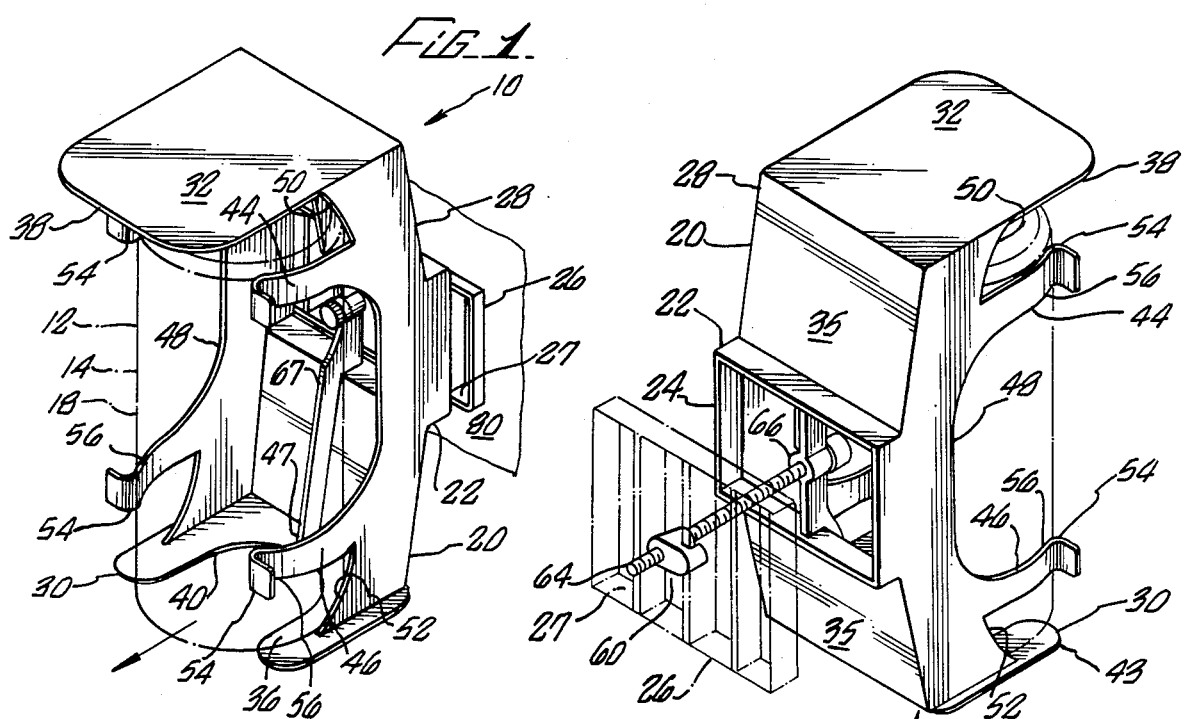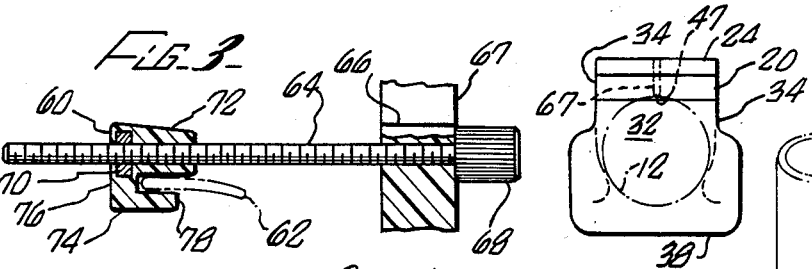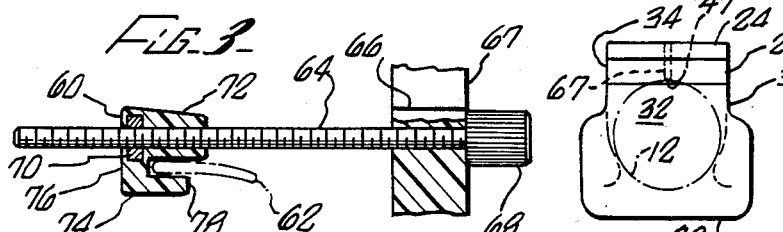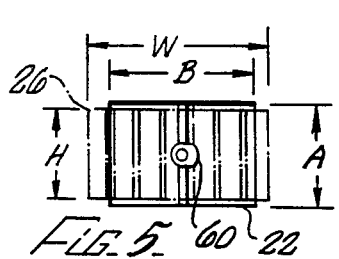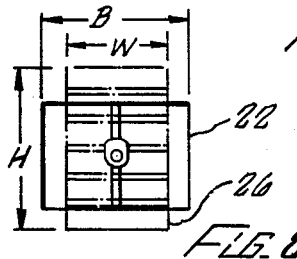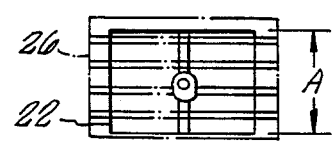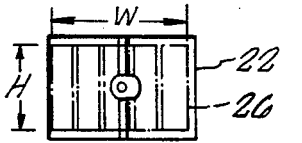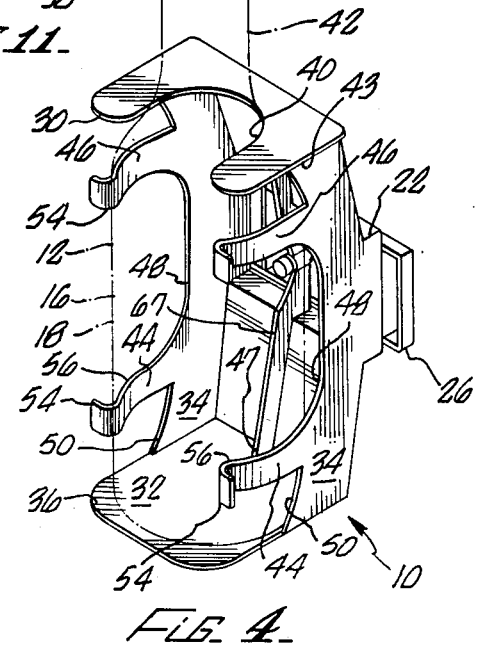

BEVERAGE COOLER-CARRIER FOR VEHICLES

BACKGROUND

The present invention relates to vehicle accessories, and more particularly to apparatus for temporary storage and cooling of a beverage container for access by an occupant of the vehicle.

Conventional beverage carriers include holders that can be attached to an interior structure of the vehicle, such as by hooking a tab of the carrier between a slidable window and its sill or frame. A beverage container such as a can or bottle is then lowered into a cylindrical cavity of the carrier, where it is retained for later use. Many of the beverage carriers of the prior art exhibit one or more of the following disadvantages:

1. The container, being loosely held in the cavity, can rattle about therein during operation of the vehicle, producing undesirable noise and harmful agitation of the beverage, as well as possibly shaking the container out of the carrier;
2. The carrier can be accidentally knocked loose from the window frame, causing further agitation of the beverage and possibly dumping the container out of the carrier;
3. The carrier is awkward to use in that separate lateral and vertical movements are required for inserting or removing the container;
4. Sunlight entering the vehicle through the adjacent window undesirably heats the container and its contents; and
5. No provision is made for cooling the beverage.

Thus there is a need for a beverage carrier that is effective for securely holding a container of the beverage in a convenient location in the vehicle where there is some protection from direct sunlight, that is easy to use and inexpensive to produce. There is a further need that the carrier be capable of cooling the beverage.

SUMMARY

The present invention meets these needs by providing a beverage carrier that can be securely fastened to a structure such as a ventilation fixture of the vehicle, the carrier laterally receiving a container of the beverage. The carrier comprises a housing having a supporting surface for the container, means for affixing the housing to the fixture, means for permitting the container to be moved laterally onto the supporting surface, and means for releasably holding the container in a fixed position on the supporting surface. In an exemplary embodiment, the means for affixing can include hook means for engaging the fixture within the cavity. The hook means can be a hook member that is movably attached to the housing for clamping the housing to the structure. Preferably the hook member is connected to the housing by a clamp screw for adjustably clamping a portion of the structure between the hook member and the housing. The hook member can extend within the duct for engaging a louver of the fixture.

The clamp screw can be a cap screw having a head member, the head member engaging the housing, the screw extending through a portion of the housing into threaded engagement with the hook member. The hook member can include a tubular nut portion, an arm portion extending from an end of the nut portion opposite the head of the screw, and a hook portion extending from the arm portion toward the head for preventing rotation of the hook member when the screw is tightened.

Preferably the housing includes means for receiving air from the ventilation fixture, means for directing the air in communication with the container, and means for passing the air to the interior of the vehicle. The receiving means can be a duct for transmitting the air outwardly from the fixture, and the directing means can include a sloping wall of the housing connecting the duct and extending toward the container for confining the air in the housing and facilitating the passage of air from the fixture. Thus the present invention advantageously provides the combination of convenient attachment of the housing to the ventilation fixture and cooling of the beverage by the passage of the ventilating air, while permitting lateral insertion and removal of the container. The cooling is particularly effective when the air is refrigerated by an air conditioning system that is frequently associated with the ventilation fixture.

The means for permitting and the means for holding the container can include a pair of finger members that extend from the housing for biasingly engaging opposite sides of the container, the finger members having first ramp means for overcoming the biasing when the container is moved onto the supporting surface and second ramp means for detenting the container on the supporting surface, the second ramp means also overcoming the biasing when the container is moved off of the supporting surface. Preferably they are vertically spaced apart first and second pairs of the finger members, the first pair being located proximate the supporting surface for permitting the container to be grasped at opposite sides between the first and second pairs of the fingers. This is an important feature that provides balanced lateral support of the container as it is being loaded or unloaded from the apparatus. In particular, as the container is laterally moved toward the apparatus, contact with the ramp means of the finger members both above and below the location on the container where it is gripped first stabilizes the container vertically, then guides the container onto the supporting surface where it is firmly restrained from further movement. Similarly, the second ramp means provides symmetric resistance to the container as it is removed from the apparatus preventing inadvertent tipping of the container.

Preferably the housing includes a shield member that extends horizontally over the container for shading the container. The shield member blocks sunlight entering the vehicle that would otherwise harmfully heat the beverage from directly reaching the container. The shield member also protects the top of the container from contamination by falling dirt or other foreign matter.

In a preferred configuration of the present invention the fastening means is capable of attaching the housing to the fixture in an inverted position, the shield member supporting the container, the supporting surface having a U-shaped opening extending horizontally outwardly from the housing for permitting the present invention to accommodate a necked container such as a bottle, a neck portion of the container extending upwardly within the U-shaped opening. In the inverted configuration, the apparatus can be used with beverages in either bottles or cans. When the beverage is only in cans, the housing would normally not be inverted so that full shading by the shield member is obtained.

DRAWINGS

These and other features, aspects, and advantages of the present invention will become better understood with reference to the following description, appended claims, and accompanying drawings where:

FIG. 1 is a front oblique elevational perspective view of apparatus according to the present invention engaging a fixture of a vehicle;

FIG. 2 is a rear oblique elevational view of the apparatus of FIG. 1.

FIG. 3 is a fragmentary sectional plan view of the apparatus of FIG. 1 taken on line 3—3 in FIG. 2;

FIG. 4 is a front elevational perspective view of the apparatus of FIG. 1 in an inverted configuration for use with a necked container such as a bottle; and FIGS. 5-10 are elevational diagrams showing the apparatus of FIG. 1 in use with alternative configurations of the fixture; and FIG. 11 is a plan view showing an alternative configuration of the apparatus of FIG. 1.

DESCRIPTION

The present invention is directed to a vehicle accessory for carrying and cooling a beverage container for access by an occupant of the vehicle. With reference with FIGS. 1-4, a carrier apparatus 10 holds a beverage container 12 such as a can 14 as shown in FIGS. 1 and 2, or a bottle 16 as shown in FIG. 4. In either case, the container 12 includes a cylindrical main portion 18. The term "cylindrical" herein means having an external surface that is generated at least in part by a straight line that moves parallel to a main axis 19 of the container 12. Thus the main portion 18 has a uniform cross section in at least two locations that are spaced apart on the main axis 19. The main portion 18 is maintained by the apparatus 10 with the main axis 19 vertically disposed for preventing loss of the beverage when the container 12 is open.

The apparatus 10 includes a housing 20 having an opening in the form of a rearwardly extending tube portion 22, the tube portion 22 terminating at a mounting surface 24 that is adapted to be supported against a ventilation fixture 26 in the interior of a vehicle (not shown). The fixture 26 typically includes a cavity 27 that is connected to an air-conditioning or ventilating system (not shown), the tube portion 22 functioning as a duct for admitting at least a portion of the output of the fixture 26 into the housing 20 as further described herein.

The housing 20 includes a body portion 28 for partially enclosing the container 12. The body portion 28 has a first end wall 30, a second end wall 32, and oppositely disposed side walls 34 extending therebetween in line with the sides of the tube portion 22. A pair of sloping rear walls 35 connect the side walls 34 between the tube portion 22 and the respective first and second end walls 30 and 32 for confining and directing the output of the fixture 26 toward the container 12 as further described herein. In the orientation shown in FIGS. 1 and 2, the first end wall 30 functions as a supporting surface for the can 14, the second end wall 32 functioning as a shield member that extends horizontally above the can 14 for blocking direct radiation from the sun, and for preventing dirt from falling onto or into the can 14. The first end wall 30 is U-shaped, having a forwardly extending opening 40 for receiving a neck portion 42 of the bottle 16 when the housing 20 is in the inverted orientation as shown in FIG. 4. The first end wall 30 includes an extension member 43 that extends laterally outwardly from each of the side walls 34 for reinforcing the housing 20 proximate the first end wall 30. The extension members 43 also extend forwardly of the container 12 for shading the container when the housing 20 is in the inverted configuration. Similarly, the shield member 38 can extend laterally beyond the side walls 34 and forwardly of the container 12 for increased shading of the container 12 from the sun as shown in FIG. 11.

Each side wall 34 includes a first finger member 44 and a second finger member 46 for holding the container 12 in a fixed upright position on the supporting surface 36. In the fixed position, the container 12 is located against stop means 47, further described below, within the housing 20. Thus, when the housing is oriented as in FIGS. 1 and 2, the first finger members 44 function as an upper pair of the finger members and the second finger members 46 function as a lower pair of the finger members. The first finger members 44 are spaced vertically apart from the second finger members 46, each of the side walls 34 forming a U-shaped opening 48 therebetween for exposing opposite sides of the container, thereby presenting a convenient vertically centered region for an occupant of the vehicle to grip opposite sides of the container 12 without interference with the housing 20. The openings 48 also permit air from the fixture 26 to exit the housing 20 while in communication with the container 12 for cooling the beverage.

Additional openings 50 are formed in each side wall 34 between the first finger member 44 and the shield member 38. Further openings 52 are provided in each side wall 34 between the second finger member 46 and the supporting surface 36. The openings 50 and 52 permit flexing of the finger members 44 and 46 as described herein as well as allowing the passage of additional air from the fixture 26 to exit the housing 20 while passing in communication with the container 12.

The first finger members 44 and the second finger members 46 are fabricated to provide spring-action properties for biasingly holding the container 12. In particular, at least one of the first finger members 44 and the second finger members 46 incorporates a first ramp member 54 for laterally flexing and spreading apart the upper and lower pairs of the finger members by contact with the container 12 as the container 12 is laterally moved into the housing 20 onto the supporting surface 36. At least one of the first finger members 44 and second finger member 46 also includes a second ramp member 56 for permitting the upper and lower pairs of the finger members to move together as the container 12 is moved into the fixed position on the supporting surface, the detenting the container 12 in the fixed position, the first finger members 44 and the second finger members 46 being in a partially flexed condition. Conversely, the container 12 can be removed from the housing 20 by forcibly moving the container 12 outwardly therefrom, the second ramp members 56 overcoming the biasing flexure of the first finger member 44 and the second finger members 46.

An important feature of the present invention is that the first finger members 44 and the second finger members 46 are vertically displaced on opposite sides of the U-shaped openings 40. Thus initial contact between the container 12 and the first ramp members 54 tends to stabilize the container 12 vertically and locate the container 12 in lateral alignment with the housing 20. Further, as the container is inserted into the housing, overcoming the biasing of the finger members, the first finger members 44 and the second finger members 46 present approximately equal resistance to movement of the container 12. Accordingly, the forces required in overcoming the biasing of the finger members are balanced about a central region of the container 12 corresponding to the location of the U-shaped openings 48. Thus the container 12 can easily be inserted into and removed from the housing 20 with minimum attention being required of an occupant of the vehicle, even while the vehicle is in motion. Also, because the container 12 is biasingly held in the fixed location by the finger members 44 and 46, it is not subject to objectionable rattling about within the housing due to movement of the vehicle. Thus unnecessary shaking of the beverage is avoided and there is less danger than the container 12 might fall out of the carrier apparatus 10.

As shown most clearly in FIGS. 2 and 3, the housing 20 is held against the fixture 26 by engagement of a hook member 60 with a grill member or louver 62 of the fixture 26. The hook member 60 is connected to the housing 20 by a clamp screw 64. The clamp screw 64 extends rearwardly from a boss 66 of the housing 20, the boss 66 forming part of a rib member 67 that extends vertically within the tube portion 22 of the housing 20. The rib member 67 also extends within the body portion 28, joining the first end wall 30 and the second end wall 32 for providing the stop means 47, and for stiffening the housing 20. The clamp screw 64 is a cap screw that is rotatably mounted in the boss 66, a head member 68 of the clamp screw 64 bearing against the boss 66 for preventing rearward movement of the clamp screw 64. The clamp screw 64 threadingly engages the hook member 60 for moving the hook member 60 toward the housing 20 as the clamp screw 64 is tightened, the head member 68 of the clamp screw 64 being accessible from the front of the housing 20 when the container 12 is removed therefrom. For this purpose, the hook member 60 can include a threaded insert 70. The hook member 60 has a tubular body portion 72, including the insert 70, for enclosing a portion of the clamp screw 64. An enlargement or arm portion 74 extends radially outwardly from the body portion 72 at a rear end 76 thereof for engaging the louver 62, or other structural element of the fixture 26 as described herein. A hook portion 78 extends from the arm portion 74 toward the head member 68 of the clamp screw 64 for retaining the louver 62 in engagement with the arm portion 74.

The apparatus of the present invention can be conveniently installed on a suitable appliance such as the fixture 26 by partially unscrewing the clamp screw 64 frm the hook member 60 for positioning the hook member at a suitable distance rearwardly from the housing 20. The housing 20 is then positioned proximate the fixture 26 with the head member 68 of the clamp screw 64 being restrained proximate the boss 66 for projecting the hook member 60 within the fixture 26 for engaging a louver 62 or other suitable structural element therein, the clamp screw 64 being positioned proximate the louver 62. Next, the housing 20 and/or the clamp screw 64 is moved a short distance outwardly from the fixture 26 for capturing the louver 62 between the hook portion 78 and the body portion 72 of the hook member 60. The clamp screw 64 is then tightened for clamping the fixture 26, including the louver 62, between the hook member 60 and the mounting surface 24 of the housing 20, the engagement of the hook portion 78 and the body portion 72 preventing rotation of the hook member 60 as the clamp screw 64 is tightened.

The present invention is compatible with a variety of configurations of the fixture 26 as shown diagrammatically in FIGS. 5-10. In particular, FIG. 5 shows the fixture 26 having a rectangular outlet configuration within which the louvers 62 are disposed vertically the fixture 26 having an opening with W and an opening height H, W being wider than a width A of the tube portion 22 of the housing 20. The fixture 26 also has an opening height H, H being less than a corresponding height A of the tube portion 22. In this situation, the clamping occurs with contact between the sides of the tube portion 22 and the fixture 26. FIG. 6 corresponds to FIG. 5, except that the louvers 62 are disposed horizontally within the fixture 26, the hook member 60 being rotated about 90° for engaging the louver 62. FIGS. 7 and 8 correspond to FIGS. 5 and 6, respectively, except that W is less than A and H is greater than B, the clamping occurring with contact between the upper and lower walls of the tube portion 22 and the sides of the fixture 26. Further, FIG. 9 shows the case where W is less than A and H is less than B, the outlet of the fixture 26 being aligned within the tube portion 22. In this case clamping occurs with clamping between the tube portion 22 and a surface associated with the fixture 26 that extends outwardly from the opening, such as surface 80 in FIG. 1. Moreover, FIG. 10 shows a situation wherein W is greater than A and H is greater than B, the tube portion 22 being confined within the opening of the fixture 26. In this case, clamping occurs with contact between the tube portion 26 and at least some of the louvers 62.

An important feature of the present invention is that the tube portion 22, in cooperation with the sloping rear walls 35 of the housing 20, provides clearance for the output of the fixture 26 above and below the tube portion 22 in he cases wherein H is greater than A, shown in FIGS. 7, 8, and 10.

The housing 20 can be fabricated from a metallic material such as sheet steel or aluminum, or preferably from a suitable plastic material such as acrylonitrile-butadinestyrene (ABS), polyvinyl chloride (PVC), or styrene, that is less subject to heating in direct sunlight than metal. The plastic material can be formed from sheetstock by cutting, bending, and bonding in any conventional manner, more preferably in injection molding for ease of manufacture. The hook member 60 can be formed of a plastic material, the insert 70 being a conventional metallic nut that is molded therein. Alternatively, the hook member 60 can be made a single part, including the threaded insert 70, from a metal such as aluminum or a zinc alloy.

The present invention advantageously provides that the housing 20 can be conveniently clamped to the fixture 26, the fixture 26 having the variety of configurations as described above, as well as other possible configurations. Some or all of the air exiting the fixture 26 passes in communication with the container 12 for cooling the beverage as described above. After passing the container 12, the air continues freely into the interior of the vehicle for ventilating and/or cooling the interior of the vehicle. Moreover, any portion of the air from fixture 26 that is not directed within the housing 20 can pass free externally to the tube portion 22 pass the housing 20. Thus the effectivity of the fixture 26 for ventilating and/or cooling the interior of the vehicle is minimally altered by the present invention, the fixture 26 is typically located within the vehicle for convenient access by an occupant of the vehicle, and for providing direct cooling of the occupant. This provides a favorable location for the carrier apparatus 10 in that it is easily accessible yet not so close as to be in the way of the occupant. Also, the fixture 26 is typically located away from the immediate vicinity of a window of a vehicle such that direct sunlight is blocked from reaching the container 12, either by the housing 20 or other structure of the vehicle. Moreover, the fixture 26 is typically located in a fixed position, not being part of a door of the vehicle. Thus the carrier apparatus 10 is not subject to jarring when a door of the vehicle is opened or closed, undesirably shaking the container 12.

Although the present invention has been described in considerable detail with reference to certain preferred versions thereof, other versions are possible. Therefore, the spirit and scope of the appended claims should not necessarily be limited to the description of the preferred versions thereof.

What is claimed is:

1. An apparatus for releasably carrying a beverage container having a cylindrical main portion in a fixed location in the interior of a vehicle, the vehicle having a stationary fixture therein, the fixture having a cavity for admitting air into the interior of the vehicle, the apparatus comprising:
   (a) a housing comprising:
      (i) a supporting surface for the container;
      (ii) a tubular member forming a duct for transmitting air from the fixture, into communication with the outside of the container, and into the interior of the vehicle;
   (b) means for fastening the housing to the fixture comprising:
      (i) a hook member for engaging the fixture within the cavity, the hook member being movable with reference to the housing;
      (ii) a clamp screw connecting the hook member to the housing for clamping a portion of the fixture between the hook member and the housing, the clamp screw having a head member and a shank portion, the head member engaging the housing, the shank portion extending through a portion of the housing into threaded engagement with the hook member;
   (c) means for permitting the container to be moved laterally onto the supporting surface and releasably holding the container in a fixed position with the main portion thereof vertically disposed on the supporting surface, comprising first and second pairs of finger members extending from the housing for biasingly engaging opposite sides of the cylindrical portion of the container, the first pair of the finger members being proximate the supporting surface, the second pair of the finger members being spaced vertically apart from the first pair for permitting opposite sides of the container to be grasped at a vertical location between the first and second pairs of the fingers, at least one of the finger members comprising:
      (i) first ramp means for overcoming the biasing as the container is moved laterally onto the supporting surface; and
      (ii) second ramp means for detenting the container in the fixed location on the supporting surface, the second ramp means also overcoming the biasing when the container is laterally moved away from the fixed location.

* * * * *